US011807258B2

(12) United States Patent
Roberts et al.

(10) Patent No.: US 11,807,258 B2
(45) Date of Patent: Nov. 7, 2023

(54) RADAR DETECTION OF UNSAFE SEATING CONDITIONS IN A VEHICLE

(71) Applicants: Toyota Connected North America, Inc., Plano, TX (US); Toyota Motor North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US)

(73) Assignees: Toyota Connected North America, Inc., Plano, TX (US); Toyota Motor North America, Inc., Plano, TX (US)

( * ) Notice: Subject to any disclaimer, the term of this patent is extended or adjusted under 35 U.S.C. 154(b) by 180 days.

(21) Appl. No.: 17/341,774

(22) Filed: Jun. 8, 2021

(65) Prior Publication Data
US 2022/0388525 A1    Dec. 8, 2022

(51) Int. Cl.
*B60W 50/12* (2012.01)
*B60W 40/08* (2012.01)
*B60W 50/14* (2020.01)

(52) U.S. Cl.
CPC ............ *B60W 50/12* (2013.01); *B60W 40/08* (2013.01); *B60W 50/14* (2013.01);
(Continued)

(58) Field of Classification Search
CPC ...... B60W 50/12; B60W 40/08; B60W 50/14; B60W 2050/143; B60W 2420/52; B60W 2540/049; B60W 2540/227
See application file for complete search history.

(56) References Cited

U.S. PATENT DOCUMENTS

| 5,770,997 A | * | 6/1998 | Kleinberg | .............. | B60N 2/002 |
| | | | | | 280/235 |
| 6,020,812 A | * | 2/2000 | Thompson | ........ | B60R 21/01558 |
| | | | | | 340/438 |

(Continued)

OTHER PUBLICATIONS

"Automatic passenger counting systems for public transport" (published in Intelligent Transport) (https://www.intelligenttransport.com/transport-articles/3116/automatic-passenger-counting-systems-for-public-transport/) (Year: 2010).*

(Continued)

*Primary Examiner* — Peter D Nolan
*Assistant Examiner* — Tanya C Sienko
(74) *Attorney, Agent, or Firm* — Christopher G. Darrow; Darrow Mustafa PC

(57) ABSTRACT

A system for controlling operation of a vehicle includes a millimeter-wave radar sensor, a processor, and a memory communicably coupled to the processor. The memory stores a sensor control module configured to control operation of the radar sensor to acquire data for determining and updating a number of occupants in the vehicle. Upon receiving a control command whose execution will result in movement of the vehicle, a pre-movement radar scan of the vehicle interior is performed. Using information acquired by the pre-movement scan, the sensor control module determines if an excessive occupant condition exists in the vehicle interior. Responsive to a determination that an excessive occupant condition exists, the sensor control module may control an operation of the vehicle other than executing the control command.

20 Claims, 6 Drawing Sheets

(52) U.S. Cl.
CPC ... *B60W 2050/143* (2013.01); *B60W 2420/52* (2013.01); *B60W 2540/049* (2020.02); *B60W 2540/227* (2020.02)

(56) References Cited

U.S. PATENT DOCUMENTS

| | | | |
|---|---|---|---|
| 2005/0046584 A1* | 3/2005 | Breed | G01S 7/4802 340/13.31 |
| 2017/0292314 A1* | 10/2017 | Scheffer | E05F 15/00 |
| 2021/0114600 A1* | 4/2021 | Uno | G06V 20/52 |
| 2021/0146867 A1* | 5/2021 | Dias Da Cruz | G01S 7/354 |

OTHER PUBLICATIONS

"Design Guide: TIDEP-01001 Vehicle Occupant Detection Reference Design", found at: https://www.ti.com/lit/ug/tidue95a/tidue95a.pdf?ts=1620866827854&ref_url=https%253A%252F%252Fwww.ti.com%252Ftool%252FTIDEP-01001 (Apr. 2018-Apr. 2020).

Vayyar "Vayyar Becomes First and Only Company in the World to Offer Full-cabin Monitoring with One-Radar-on-Chip", found at: https://blog.vayyar.com/vayyar-single-chip-three-rows, pp. 1-5, dated Mar. 24, 2021 (accessed May 13, 2021).

Vayyar, "The Baby Didn't Know She's Been Left in the Car. But the Car Knew (and more)", found at: https://vayyar.com/auto/ (accessed Jun. 7, 2021).

Alizadeh et al., "Low-cost low-power in-vehicle occupant detection with mm-wave FMCW radar," 2019 IEEE Sensors, 2019, pp. 1-4, doi: 10.1109/SENSORS43011.2019.8956880.

Kishore, "Using TI mmWave technology for car interior sensing" found at: https://e2e.ti.com/blogs_/b/behind_the_wheel/posts/ti-mmwave-technology-for-car-interior-sensing, (accessed May 14, 2021).

Galdia et al., "Localization of Passengers Inside Intelligent Vehicles by the Use of Ultra Wideband Radars", fSignal Processing, Image Processing and Pattern Recognition. SIP 2011. Communications in Computer and Information Science, vol. 260. Springer, Berlin, Heidelberg.

"Ignition Interlock Devices" article, found at: https://www.michigandefenselaw.com/ignition-interlock-devices.html (accessed May 13, 2021).

"Ignition Interlock" article, found at: https://www.loadingzonesafety.com/ignition-interlock (accessed May 14, 2021).

\* cited by examiner

RADAR DETECTION OF UNSAFE SEATING CONDITIONS IN A VEHICLE

TECHNICAL FIELD

The subject matter described herein relates to autonomous control of vehicle sensors and vehicle operations responsive to sensor data. More particularly, the subject matter described herein relates to control of operation of one or more millimeter-wave radar sensors to scan an interior of a vehicle and control of vehicle operations responsive to detection, by the radar sensor(s), of an unsafe seating condition of one or more occupants in the vehicle.

BACKGROUND

Vehicle occupants (especially children) may be positioned in a vehicle so as to create an unsafe seating condition in which, for example, an occupant is not seated in a vehicle seat or is not secured in a seat by a seatbelt. It is desirable to detect such unsafe seating conditions as soon as possible, but especially before the vehicle moves along a road surface, so that the unsafe condition may be remedied.

SUMMARY

In one aspect of the embodiments described herein, a system for controlling operation of a vehicle is provided. The system includes a millimeter-wave radar sensor, a processor, and a memory communicably coupled to the processor. The memory stores a sensor control module including computer-readable instructions that when executed by the processor cause the processor to, when the vehicle is stationary, and while one or more doors of the vehicle are open, automatically control operation of the radar sensor to perform at least one preliminary scan of a portion of an interior of the vehicle including the one or more open doors. The sensor control module is also configured to determine, using information acquired by the at least one preliminary scan of the vehicle interior, a number of occupants currently in the vehicle. The sensor control module is also configured to repeat the preliminary scanning operation and the determination of the number of occupants until all doors of the vehicle are closed. The sensor control module is also configured to, responsive to receiving a control command whose execution will result in movement of the vehicle, control operation of the radar sensor to perform a pre-movement scan of the vehicle interior. The sensor control module is configured to determine, using information acquired by the pre-movement scan, if an excessive occupant condition exists in the vehicle interior. Responsive to a determination that an excessive occupant condition exists, the sensor control module may control an operation of the vehicle other than executing the control command.

In another aspect of the embodiments described herein, a method of controlling operation of a vehicle is provided. The method includes steps of, when the vehicle is stationary, and while one or more doors of the vehicle are open, automatically controlling operation of a millimeter-wave radar sensor to perform at least one preliminary scan of a portion of an interior of the vehicle including the one or more open doors; determining, using information acquired by the at least one preliminary scan of the vehicle interior, a number of occupants currently in the vehicle; and repeating the steps of performing the preliminary scan and determining the number of occupants until all doors of the vehicle are closed. The method also includes steps of receiving a control command whose execution will result in movement of the vehicle; responsive to receiving the control command, controlling operation of the radar sensor to perform a pre-movement scan of the vehicle interior, and determining, using information acquired by the pre-movement scan, if either of an excessive occupant condition or an insufficient seat occupation condition exists in the vehicle interior. The method also includes steps of, if neither of the excessive occupant condition or the insufficient seat occupation condition exists, executing the control command and, if either of the excessive occupant condition or the insufficient seat occupation condition exists, controlling an operation of the vehicle other than executing the control command.

In yet another aspect of the embodiments described herein, a non-transitory computer readable medium is provided. The medium has stored therein instructions, that when executed by a computing system, cause the computing system to perform functions including when the vehicle is stationary, and while one or more doors of the vehicle are open, automatically controlling operation of a millimeter-wave radar sensor to perform at least one preliminary scan of a portion of an interior of the vehicle including the one or more open doors; determining, using information acquired by the at least one preliminary scan of the vehicle interior, a number of occupants currently in the vehicle; and repeating the steps of performing the preliminary scan and determining the number of occupants until all doors of the vehicle are closed. Further instructions are included which cause the computing system to perform functions including receiving a control command whose execution will result in movement of the vehicle; responsive to receiving the control command, controlling operation of the radar sensor to perform a pre-movement scan of the vehicle interior, and determining, using information acquired by the pre-movement scan, if either of an excessive occupant condition or an insufficient seat occupation condition exists in the vehicle interior. Further instructions are included which cause the computing system to perform functions including, if neither of the excessive occupant condition or the insufficient seat occupation condition exists, executing the control command and, if either of the excessive occupant condition or the insufficient seat occupation condition exists, controlling an operation of the vehicle other than executing the control command.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system designed to control operations of a vehicle responsive to a determination that an unsafe seating condition exists in the vehicle occupant compartment. A millimeter-wave (MMW) radar sensor may scan the vehicle interior for occupants and determine the number of occupants present and where the occupants are seated. The number of occupants and the occupant seating positions may be compared with characteristics of various unsafe seating conditions stored in memory to determine if any such conditions currently exist in the vehicle. Various aspects of vehicle operation (such as generation of appropriate alerts and delays in movement of the vehicle) may be controlled responsive to the unsafe seating condition, thereby allowing the unsafe seating condition to be corrected.

Figure 1:
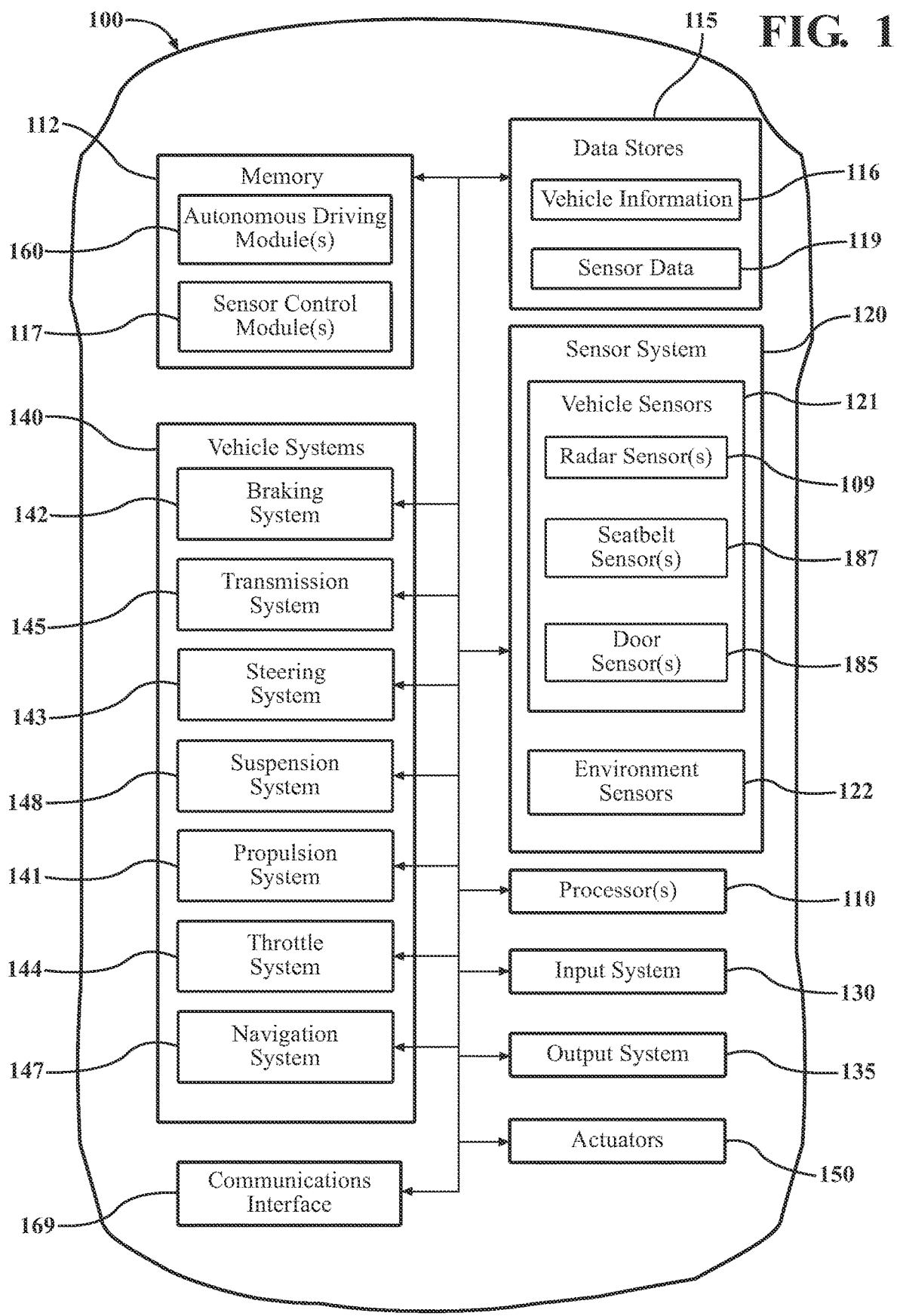
FIG. 1 is a schematic view of a vehicle incorporating a system for controlling one or more vehicle sensors for monitoring an interior or occupant compartment of the vehicle and controlling operations of the vehicle responsive to sensor data, in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for controlling one or more vehicle sensors for monitoring an occupant compartment of the vehicle, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processor(s) 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s)

110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

The one or more data store(s) 115 can include vehicle information 116. The vehicle information 116 can include any information relating to the vehicle 100 which enables and/or facilitates operation of the radar sensor 109, the sensor control module 117 and/or any component or system of the vehicle in performance of any of the functions and operations described herein. For example, vehicle information 116 may include information relating to interior zone boundaries and dimensions (including seating zones 1, 2, and 4-6, floor zone 3, cargo zone 7, and other predefined zones (if any), locations of various vehicle surfaces (such as seating surfaces and surfaces from which airbags may be deployed) with respect to the radar sensor and/or with respect to other surfaces or locations in the vehicle interior, and other pertinent information.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system can acquire data of the vehicle occupant compartment, such as the number and positions of occupants, whether or not an occupant is out of position, detection of living objects, and other data described herein. The sensor system 120 can also acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described or to the particular sensors shown in FIG. 1. The example sensors may be part of the one or more environment sensors 122 and/or the one or more vehicle sensors 121. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility. The sensors may also be operably connected to other vehicle systems and components, such as data stores 115 and processor(s) 110, for storage and processing of vehicle and environmental sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect events and conditions in the vehicle occupant compartment. The occupant compartment or interior of the vehicle may comprise the enclosure in which the vehicle seats are located and/or in which vehicle occupants reside during travel in the vehicle.

In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed.

The vehicle sensor(s) 121 may include sensors configured to detect conditions and/or events inside the vehicle interior or occupant compartment. Such sensors may include door sensors 185 configured to detect open and closed conditions of each vehicle door and to detect the opening and closing of any door by a vehicle occupant. Sensors system 120 may include seatbelt sensors 187 configured to detect buckled and unbuckled conditions of the vehicle seatbelts.

Embodiments of a system for controlling an operation of the vehicle 100 described herein may incorporate one or more millimeter-wave (MMW or mm-wave) radar sensor(s) 109 to scan the interior of the vehicle and acquire data usable for the purposes described herein. Millimeter-wave radar generally refers to a radar operating in the millimeter-wave band. Generally, the millimeter wave band is in the frequency domain of 30-300 GHz (wavelength of 1-10 mm). In particular arrangements, a MMW radar sensor usable for the purposes described herein may operate within a frequency range of 60-GHz to 80-GHz inclusive. In one or more arrangements, a single radar sensor 109 may be employed to acquire data for use in acquiring data and performing the operations described herein. However, more than one radar sensor may also be used in different sensor configurations (for example, to increase the resolution of the system).

MMW radar is a radar technology which uses three-dimensional cloud point mapping and analysis to detect objects and object movements. For instance, MMW radar may be configured to detect an object that other types of sensors (for example, an ordinary camera) cannot because the radar can penetrate at least a portion of the material from which a vehicle seat is formed. The point cloud may be generated from the radar scan data using known methods. Object location, dimensional, and density data may be represented in distinguishable characteristics of each voxel in a point cloud. The density data may enable the radar to determine or estimate characteristics of an object such as a material from which the object is formed and also other characteristics.

The MMW radar sensor 109 may be configured to detect subtle changes in the generated point cloud configurations, corresponding to slight movements of the detected objects within the vehicle interior. Conventional cameras, lasers, and ultrasonic sensors may not be capable of detecting such movements. The MMW radar 109 may be configured to detect individual objects and vehicle occupants and their locations within the vehicle interior, and to determine whether a detected object is living or inanimate. Each occupant may be represented as an associated generated point cloud, the configuration of which may change corresponding to movement of the occupant as detected by successive radar scans. Thus, movements of an object over time may be monitored by successive radar scans and evaluation of associated point clouds. In one particular example, the radar sensor 109 may be capable of detecting movements of an occupant's chest during respiration.

The radar sensor 109 may be configured to scan for objects having particular characteristics such as living objects smaller than a predetermined size. The radar sensor 109 may be configured to distinguish features such as the locations and sizes of individual occupants. The MMW radar 109 may also be configured to detect occupant characteristics such as density, length, and width and/or girth. Using these parameters, the weight of an occupant may be estimated. In addition, the MMW radar may be configured to determine whether an occupant is an adult, a child or an infant. The radar sensor 109 may be configured or trained to detect whether or not an occupant is seated.

Radar sensor 109 may be configured to detect when an occupant is out of position. For example, the radar sensor 109 may be configured to detect motions of a torso of an occupant. Any displacement of an occupant torso, either vertically or horizontally, beyond an associated predetermined threshold amount in relation to a known location of a vehicle seat may indicate that the occupant is unseated. If an occupant is determined to be unseated while the vehicle is moving, the occupant may be deemed to be out of position.

In another example, if vehicle seat is determined to be occupied at a first point in time while the vehicle is moving and the seat is subsequently determined to be unoccupied while the vehicle is still moving, it may be determined that an occupant has left the seat while the vehicle is moving and is, therefore, out of position.

In yet another example, certain zones or portions of the occupant compartment may be predefined as locations where a torso of an occupant should not reside when the vehicle is moving. If a vehicle sensor determines that the torso of an occupant is in one of these regions while the vehicle is moving, the occupant may be deemed to be out of position. "Out-of-position" may be otherwise defined in any suitable manner, for example, situationally and in consideration of a particular vehicle occupant compartment design.

The radar may be configured to detect a child car seat and where the child car seat is positioned. The radar may be configured to detect values of various parameters and dimensions of the child car seat, such as length, width, a depth of the seat (measured from a rear of the child seat seating surface in contact with a vehicle seat back to a front edge of the child seating surface), a height to which a back of the child car seat extends above a vehicle seating surface on which the car seat resides, a height to which a seating surface of the child car seat extends above the vehicle seating surface, and other features.

Figure 3:
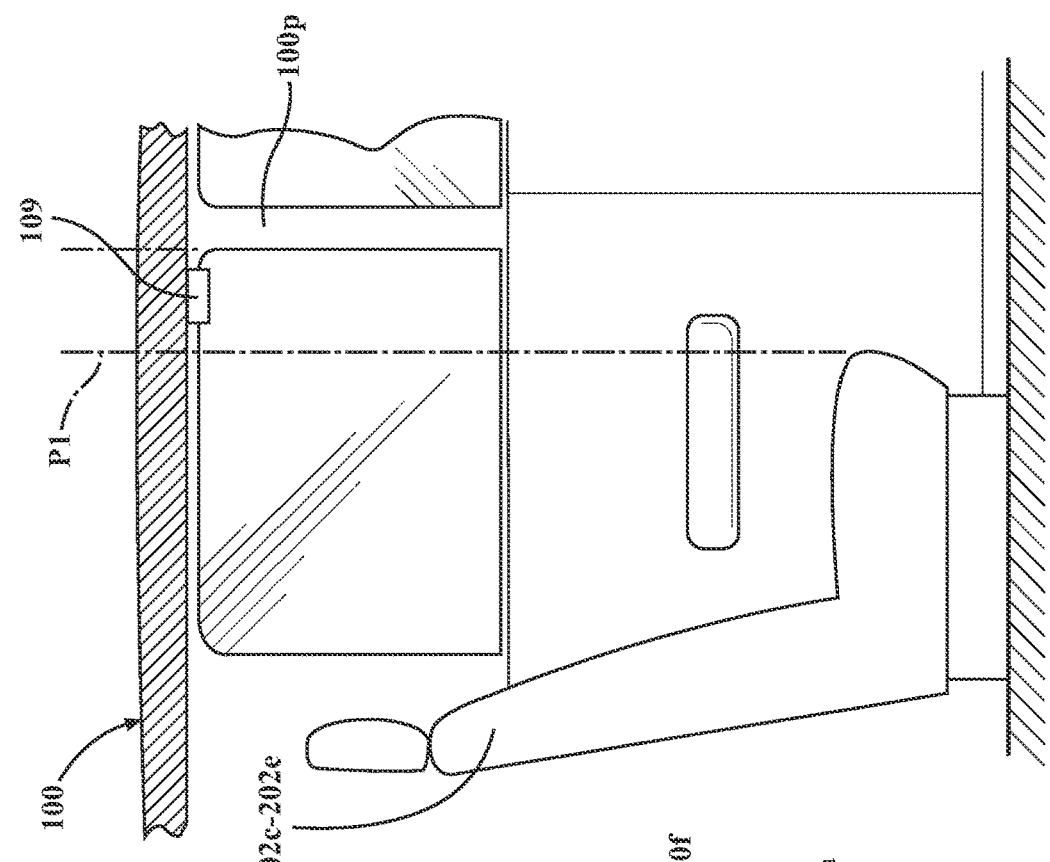
FIG. 3 is a schematic cross-sectional side view of a vehicle interior showing a positional arrangement of a MMW radar sensor in accordance with an embodiment described herein.

FIG. 3 is a schematic cross-sectional side view of a vehicle interior showing a positional arrangement of a MMW radar sensor in accordance with an embodiment described herein. in the arrangement shown, the sensor may be positioned aft of the vehicle "B"-pillar and forward of a vertical plane P1 extending along a forward-most edge of the vehicle rear seats 202c-202e. However, the radar sensor 109 may be positioned in any of several other locations, depending on the requirements of a particular application.

In particular configurations, the radar sensor 109 may operate as an imaging radar within the frequency range of 60-GHz to 80-GHz for purposes of scanning the vehicle occupant compartment. A single sweep of the radar scanner may scan the entire portion of the vehicle occupant compartment detectable in the field of vision of the radar sensor. A single sweep of the sensor and associated processing may produce a single frame of data. In one or more configurations, the radar sensor 109 may operate at about 5 frames/per second (i.e., 5 sweeps per second). Operating under these parameters, it is desirable to acquire data for a period of 5-10 seconds to facilitate removal of anomalies from the data and provide a clear image. Thus, a "scan" may comprise enough sweeps to provide sufficient data to facilitate removal of anomalies from the data and provide a clear image. In one or more configurations, the maximum scanning rate is 5 sweeps per second.

In particular configurations, radar sensor power consumption may be between 170-280 mA per frame for active scanning at 5 sweeps/second at 12 volts DC, and 55 uA at a lowest scanning rate contemplated herein. The entire radar sensor assembly (including, for example, microcontroller associated circuitry and CAN-transceiver hardware) may be configured for operation at 12 volts DC. Peak RF sweep power may be around 4.6 W.

Information relating to various characteristics of the vehicle may be programmed and/or stored in vehicle information 116 in data stores 115 and/or in the sensor control module 117. For example, the sensor system 120 or data stores 115 may be programmed with details of the vehicle interior, including the number of seats (for example, five seats defined in terms of seating zones) available to occupants, a reference location of each of seating zones A, B, and D-F and of other radar-scan zones (such as zones B and G) with respect to the radar sensor, pertinent boundaries and dimensions of each zone, locations and dimensions of key vehicle interior surfaces, and other locations and parameters pertinent to detecting unsafe seating conditions and performing other operations as described herein. The system may use an initial baseline scan from when the vehicle is empty as a point of comparison against a previous or current radar scan to distinguish between separate added objects. Machine learning algorithms employing neural networks may also be used to teach the sensor to recognize, classify and track various objects and condition in the vehicle.

Figure 2:
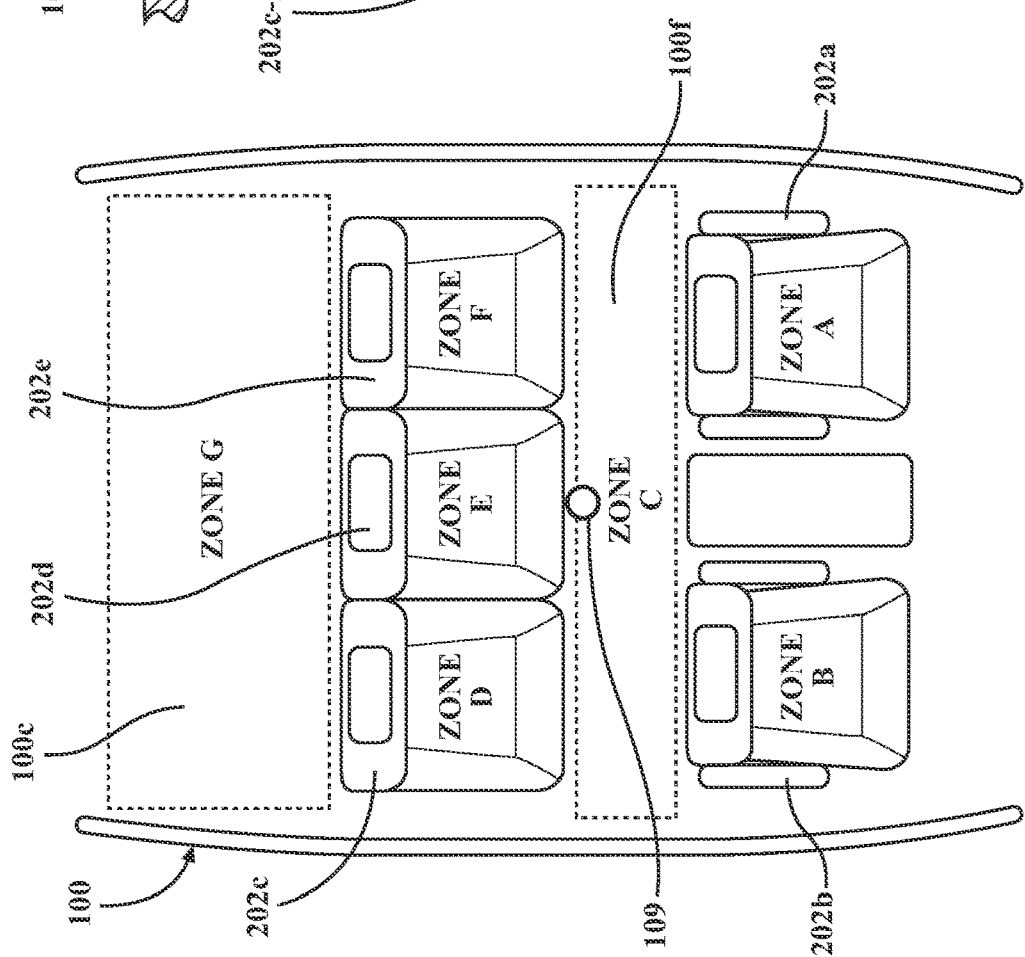
FIG. 2 is a schematic plan view of a vehicle interior showing an exemplary vehicle seating arrangement of five seats in associated seating zones A, B, and D-F, along with an additional floor zone C and cargo zone G.

FIG. 2 is a schematic plan view of a vehicle interior showing an exemplary vehicle seating arrangement of five seats 202a-202e and associated seating zones A, B, and D-F, along with an additional floor zone C and a cargo zone G. Each seating zone may be structured to seat a single occupant during movement of the vehicle. To this end, each seating zone may include an associated seat belt (not shown). The MMW radar may be configured to monitor each seating zone for occupants.

In one or more arrangements, vehicle interior zones may include front seating zones (including a driver side zone A and a passenger side zone B) and rear seating zones D-F located behind the front seats and rearwardly of the floor zone C. Individual rear seating zones may be defined with respect to locations of individual seats (as shown in FIG. 2) or with respect to locations of seat belts installed in a continuous "bench"-type rear seat. In addition, a radar-scannable floor zone C may be located between the front and rear seats, and a cargo zone G may be located behind the rear seats (in a hatchback cargo area, for example). The details and pertinent dimensions of the vehicle interior may be particular to each make and model of vehicle and may be programmed into a memory for reference and comparison with radar information using known methods.

The MMW radar 109 may be "trained" to recognize, with a high degree of accuracy and repeatability, various conditions in the vehicle interior. Training may be performed through programming, by repeated exposure to each condition, and/or by other known methods. In one or more arrangements, the MMW radar may be trained to recognize various unsafe occupant seating conditions.

Figure 4:
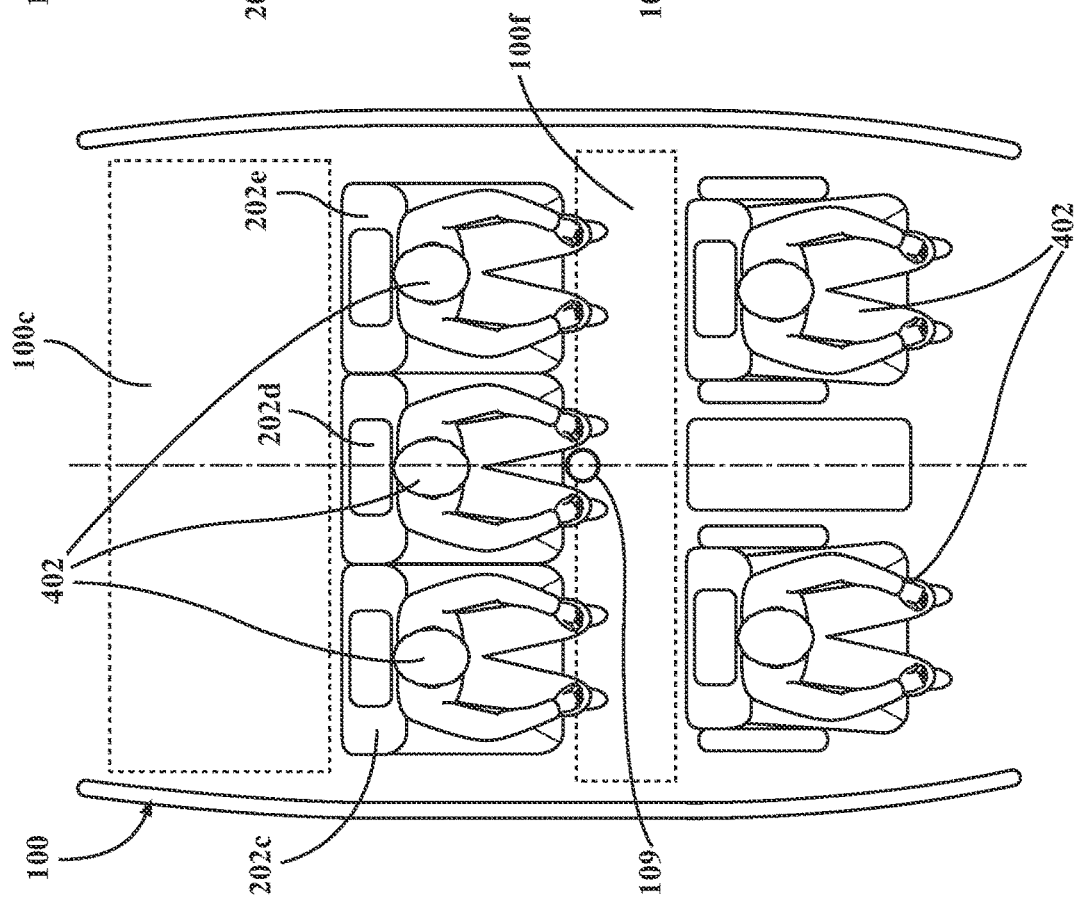
FIG. 4 is a schematic plan view of the vehicle similar to the view of FIG. 2, showing five seating zones with an occupant properly seated in each seat of an associated seating zone.

FIG. 4 is a schematic plan view of the vehicle similar to the view of FIG. 2, including five seating zones A, B, and D-F with an occupant properly seated in each seat of an associated seating zone. The unsafe seating conditions described below may deviate from the properly seated occupant arrangement shown in FIG. 4.

The term "unsafe seating condition" may refer to any of the special conditions described herein, including a stacking condition, a multiple occupant condition, a boundary overlap condition, a condition where the occupant is on the floor or in a cargo area, any other scenario which causes an insufficient seat occupation condition or an excessive occupant condition, and any other condition in which an occupant is not seated in a designated seating zone. Several examples of unsafe seating conditions are described below.

Figure 6:
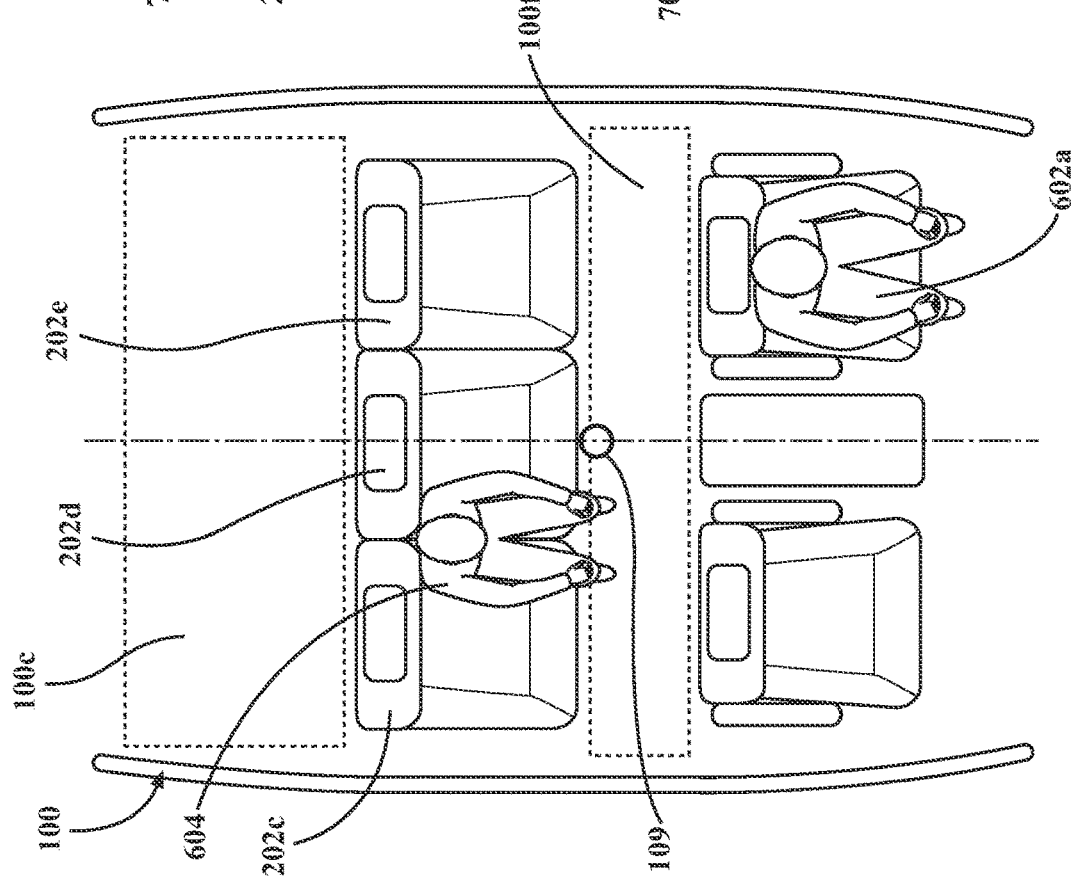
FIG. 6 is a schematic plan view of the vehicle similar to the view of FIG. 2 and showing a boundary overlap condition in which an occupant is improperly seated straddling a boundary between seating zones D and E.

One unsafe seating condition which may occur is a "boundary overlap" condition. A "boundary overlap" condition may be a condition where processing of the radar data and the generated point cloud indicates that at least a minimum predetermined percentage (e.g., 20%) of an occupant positioned in a first seating zone extends across a boundary of a second, adjacent seating zone. This may occur, for example, where a portion of one child residing primarily in a first seating zone extends over a seating zone boundary between the first seating zone and an adjacent seating zone. This may be an indication that the child is not properly belted into his/her seat. FIG. 6 is a schematic plan view of the vehicle similar to the view of FIG. 2 and showing a boundary overlap condition in which an occupant 604 is improperly seated. The occupant 604 in FIG. 6 straddles the boundary between seating zones D and E and thus is probably not properly secured by a seat belt.

Figure 7:
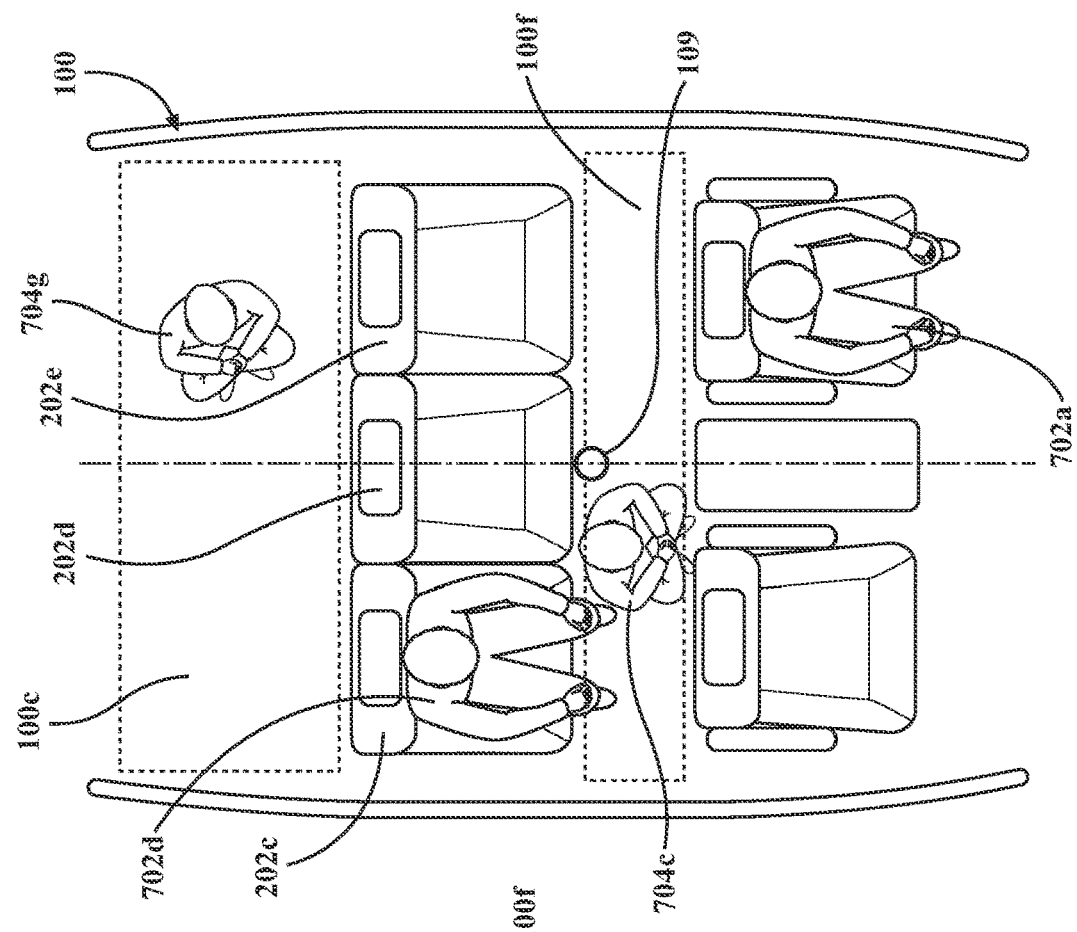
FIG. 7 is a schematic plan view of the vehicle similar to the view of FIG. 2, showing occupants properly seated in seats in zones A and D and also showing additional occupants improperly seated in cargo zone G and floor zone C, respectively.

Another unsafe seating condition may occur in which an occupant is not seated in a vehicle seat. FIG. 7 is a schematic plan view of the vehicle similar to the view of FIG. 2, showing occupants 702a and 702d properly seated in seats in zones A and D, respectively, and also additional occupants 704g and 704c improperly seated in cargo zone G and floor zone C, respectively.

Figure 8:
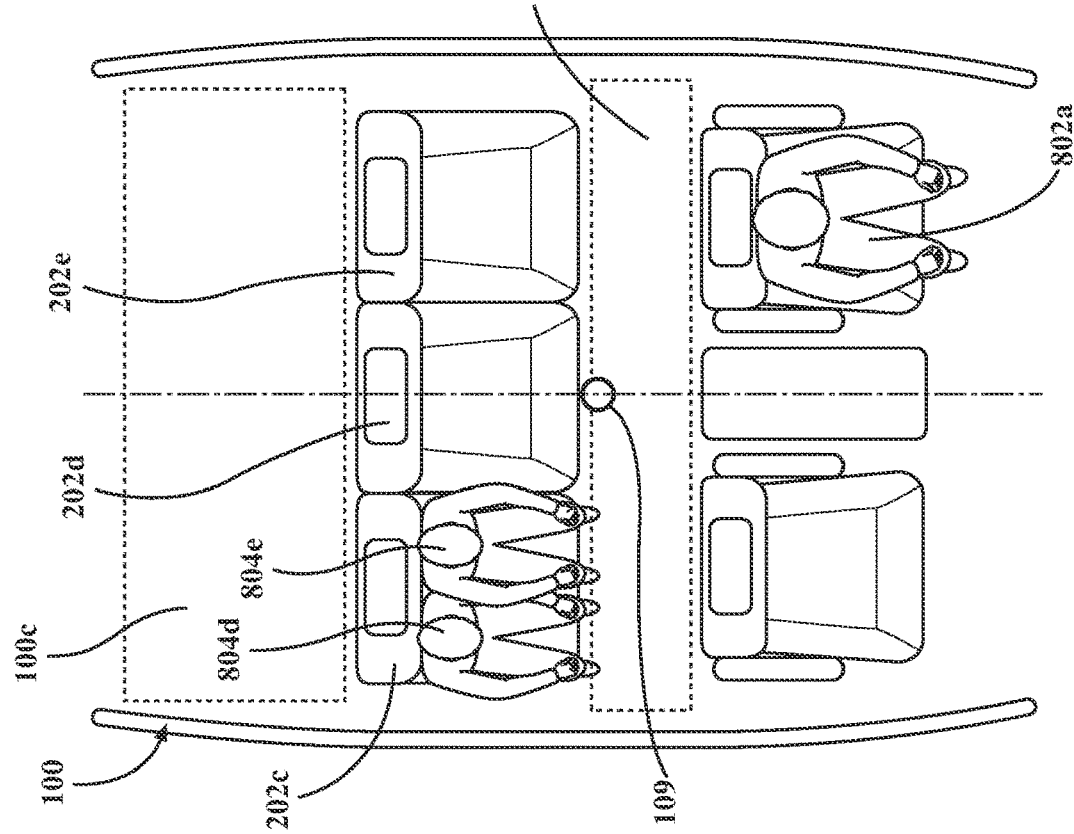
FIG. 8 is a schematic plan view of the vehicle similar to the view of FIG. 2, showing an occupant properly seated in a seat in zone A and also showing additional occupants improperly seated in a multiple occupant condition in a seat in seating zone D.

Another unsafe seating condition which may occur is a "multiple occupant" condition. A "multiple occupant" condition may be a condition where multiple occupants (for example, small children) are positioned within a single seating zone. The system for controlling operation of the vehicle may determine that a multiple occupant condition exists when processing of the radar data and the generated point cloud indicates that at least a predetermined percentage (e.g., 85%) of each of two occupants is positioned in a single seating zone. For example, the heads and torsos of two children may be located within a single seating zone while portions of the arms or legs of one or more children may lie outside a boundary of the seating zone. FIG. 8 is a schematic plan view of the vehicle similar to the view of FIG. 2, showing an occupant 802a properly seated in a seat in zone A and also showing additional occupants 804d and 804e improperly seated in a multiple occupant condition in the seat in zone D.

Figure 9:
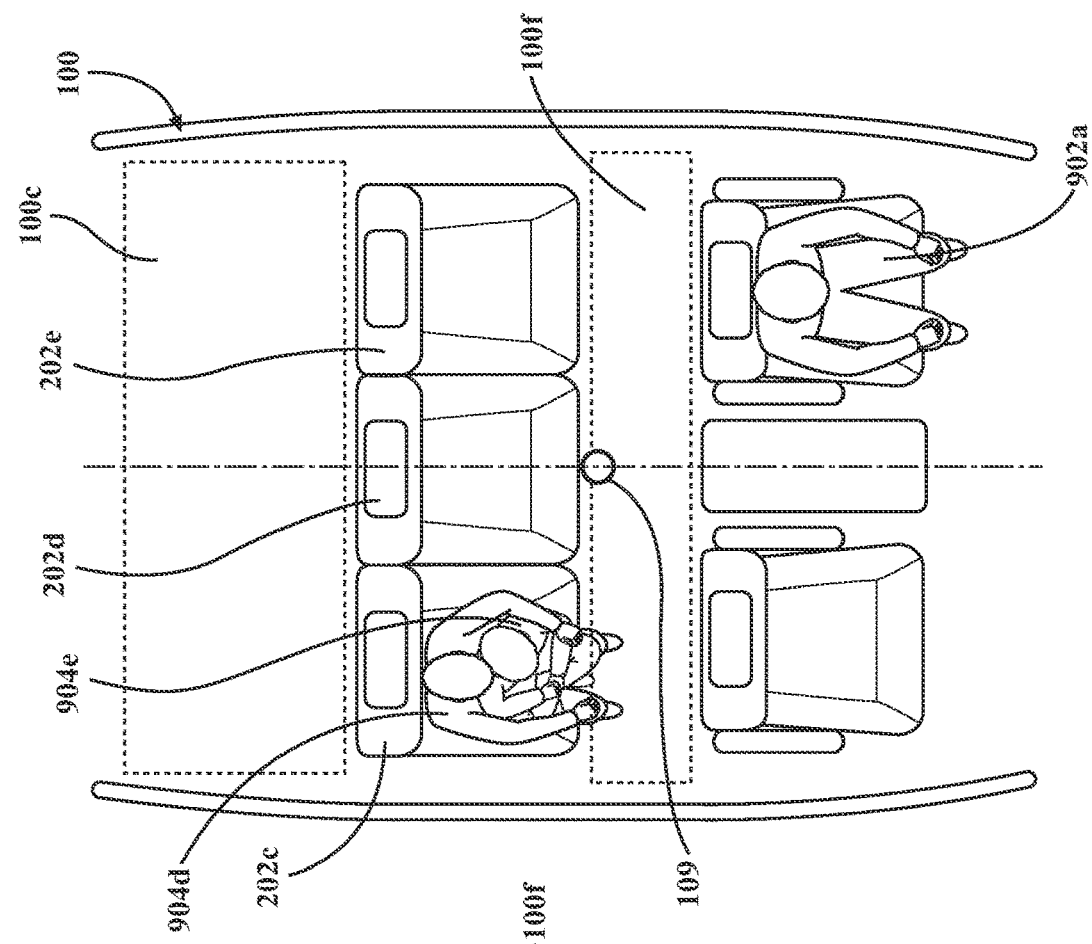
FIG. 9 is a schematic plan view of the vehicle similar to the view of FIG. 2, showing an occupant properly seated in a seat in zone A and also showing additional occupants improperly seated in a "stacking" condition in the seat in zone D.

Another unsafe seating condition which may occur is a "stacking" condition. A "stacking" condition may occur when one occupant is seated on top of another, properly seated occupant (for example, in the lap of another occupant). While the MMW radar may be capable of detecting such a condition (for example, by detecting individual relative movements of the stacked occupants), there are conditions under which it may be difficult for the radar sensor 109 to detect stacked occupants. For example, while scanning at a relatively lower scanning rate to conserve power, it may be difficult to detect an occupant stacking condition. However, such a condition may be detected as described herein by monitoring the number of occupants currently in the vehicle and determining the number of occupants seated or otherwise positioned in one of the vehicle interior seating zones. FIG. 9 is a schematic plan view of the vehicle similar to the view of FIG. 2, showing an occupant 902a properly seated in a seat in zone A and also showing additional occupants 904d, 904e improperly seated in a "stacking" condition in the seat in seating zone D.

As used herein, the term "preliminary scan" refers to a MMW radar scan performed prior to receipt and/or implementation by the sensor control module 117 or any of the vehicle systems 140 of a control command whose execution will result in movement of the vehicle 100. The preliminary scan(s) may be directed to determining and tracking a number of occupants currently in the vehicle interior while the vehicle is stationary. More specifically, the preliminary scan(s) may be directed to providing data usable to track the number of occupants entering the vehicle and exiting the vehicle through one or more open doors of the vehicle. This information may be used to determine and update a total number of occupants residing in the vehicle interior at any given time (i.e., number of occupants that entered the vehicle−number of occupants that exited the vehicle=number of occupants currently in the vehicle interior). A control command whose execution will result in movement of the vehicle may be generated by a human user (for example, by shifting gears or by pressing an accelerator pedal) or by the autonomous driving module 160.

In one or more arrangements, one or more preliminary radar scans may be performed while the vehicle engine is turned off. In such arrangements, a single scan may be performed, or multiple scans may be performed either intermittently or at regular intervals. Also, when the vehicle engine is turned off, multiple preliminary radar scans may be performed at a relatively lower scanning rate to conserve battery power. When the engine is turned on and the vehicle is still stationary, the radar sensor 109 may draw power from the engine and any radar scans may be performed at one or more relatively higher scanning rates.

Preliminary scan(s) may be performed at a scanning rate commensurate with reliable detection of occupants entering and leaving the vehicle interior, while conserving battery power to the greatest degree possible. In one or more particular arrangements, the preliminary scan(s) may be performed at a scanning rate of two frames per second.

A pre-movement scan is a MMW radar scan performed after receipt of a control command whose execution will result in movement of the vehicle. The pre-movement scan may be a final scan performed before the vehicle moves, to determine the seating status of the vehicle occupants. The occupants should be properly seated with a single occupant in each seating zone (as shown in FIG. 4, for example) before the vehicle moves.

The scans may monitor portions of the vehicle interior (such as vehicle doorways) through which occupants may enter of exit. A "door" or "doorway" as used herein may be defined as any opening into the vehicle interior through which an occupant may enter or exit the vehicle interior. This may include conventional side doors, hatchbacks, etc. Open doors may be detected using information acquired from the preliminary radar scans or from door sensors configured to detect "open" and "closed" states of each door. In one or more arrangements, a door may be considered "closed" when the door is in a position where the vehicle may move along a surface on which it resides without an "open door" alert being triggered.

A movement scan is a MMW radar scan performed while the vehicle is moving, for example, along a road surface during travel. The movement scans are directed to detected unsafe seating conditions which occur while the vehicle is in motion. Because the radar sensor 109 may be powered by the engine while the engine is on, movement radar scans may be performed at a relatively higher scanning rate without draining the battery. Upon detection of an unsafe seating condition during vehicle movement, the sensor control module 117 may control operation of the vehicle to, for example, generate an alert to the driver that the unsafe seating condition exists. The sensor control module 117 may also control operation of the vehicle to, for example, cooperate with the navigation system 147 to automatically determine a safe place to pull the vehicle over as soon as possible, to enable the driver to address the unsafe seating condition. This information may be contained in a message or alert generated for the driver. In an autonomously-driven vehicle, the sensor control module 117 may operate in cooperation with the autonomous driving module(s) 160 and the navigation system 147 to automatically determine a safe location to pull over and to autonomously guide the vehicle 100 to the safe location.

An "insufficient seat occupation condition" may be a condition where there are a sufficient number of seats for the current number of vehicle occupants, but at least one occupant appears to not be seated in a seat. For example, the sensor system 120 or data stores 115 may be programmed with details of the vehicle interior, including the number of seats (for example, five seats defined in terms of seating zones) available to occupants. Processing of radar sensor information may indicate that four occupants are currently in the vehicle, but that only three of the occupants are seated in one of the pre-defined seating zones. FIG. 7 shows an example of such a condition, with an occupant 704c improperly seated in floor zone C and another occupant 704g improperly seated in cargo zone G.

Figure 5:
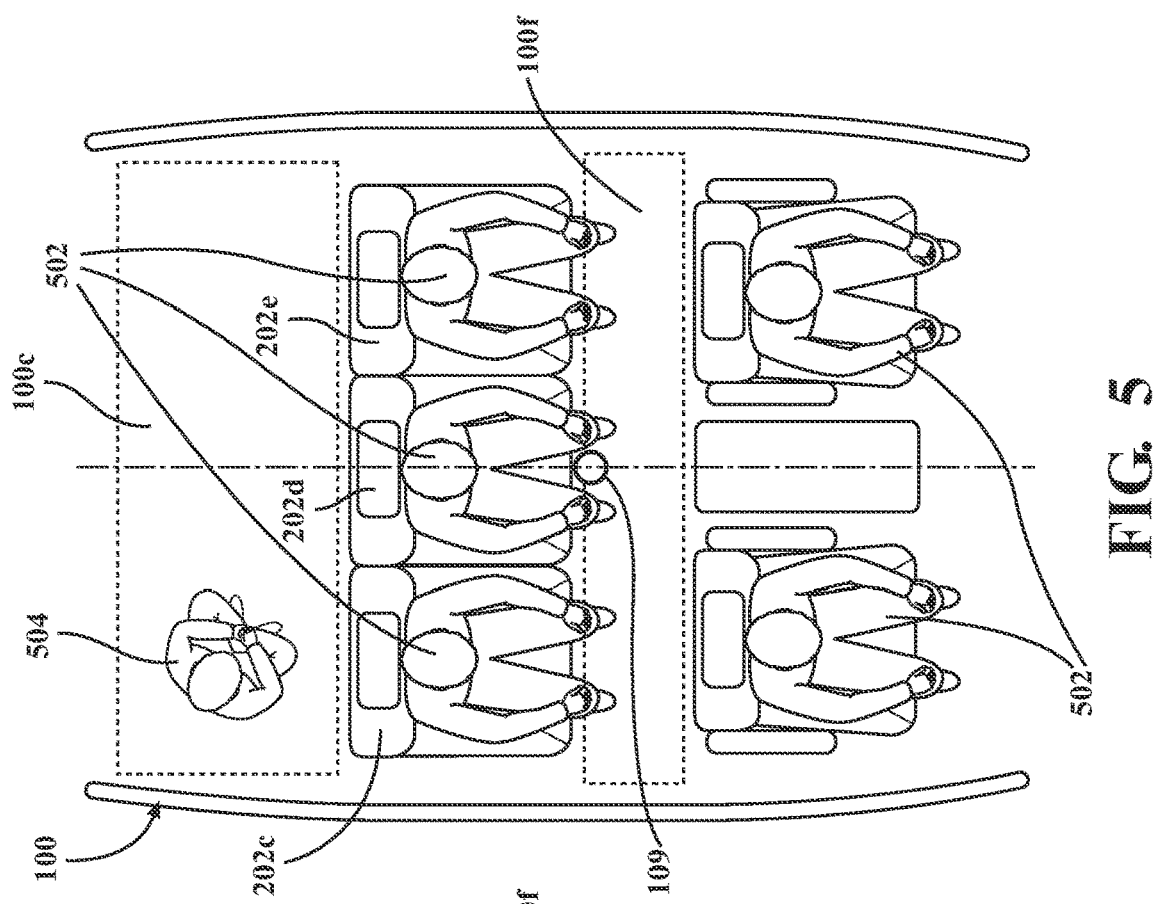
FIG. 5 is a schematic plan view of the vehicle similar to FIG. 2 showing five occupants properly seated in associated seating zones A, B, and D-F, and also showing an occupant improperly seated in a cargo zone G.

An "excessive occupant condition" may occur where the number of occupants currently in the vehicle exceeds the number of seats available for the occupants. Such a condition may be detected by comparing the available number of seats to the number of occupants currently in the vehicle, as detected by the radar sensor. An example of such a condition is shown in FIG. 5, which is a schematic plan view of the vehicle similar to FIG. 2 showing five occupants 502 properly seated in seating zones A, B, and D-F, and also showing an occupant 504 improperly seated in cargo zone G.

Controlling an operation of the vehicle may include automatically controlling operation of some portion of the vehicle to perform a specific task or function. For example, in one or more arrangements, operation of the vehicle may be controlled by controlling operation of the output system 135 to generate an alert directed to a human user and indication a particular condition detected by the MMW radar 109. In particular embodiment, a schematic diagram of the vehicle interior may be displayed on a screen display of the output system 135 or a cellular device, illustrating a nature of the alerted condition and its location in the vehicle interior. Various automatic vehicle control functions and responses to radar scan information may also be selectable by a user through the input system 130.

For example, the sensor control module 117 may include instructions enabling user selection of an option by which operation of the vehicle may be controlled by automatically preventing implementation of a control command whose execution will result in movement of the vehicle, until receipt of a generated alert has been acknowledged by a human user. The sensor control module 117 may be configured (or configurable by a user) to receive an acknowledgement in any suitable form, for example, by a user pushing a button, by voice command, etc.

In another example, the sensor control module 117 may include instructions enabling user selection of an option by which operation of the vehicle may be controlled by automatically preventing implementation of a control command whose execution will result in movement of the vehicle, until a detected unsafe seating condition has been resolved and all occupants are seated safely.

In another example, the sensor control module 117 or autonomous driving module 160 may include instructions enabling user selection of an option by which operation of the vehicle 100 may be controlled by automatically pulling an autonomously-driven vehicle over to a safe location upon detection of one or more of the unsafe seating conditions described herein.

In one or more particular arrangements, the vehicle may be configured to enable a user to use the input system 130 to select an option whereby the sensor control module 117 automatically generates a signal preventing shifting of the transmission to a "drive" mode until receipt of a generated alert has been acknowledged by a human user or until a detected unsafe seating condition has been resolved and all occupants are seated safely, unless and until the signal or command preventing shifting to the "drive' mode is manually over-ridden by a user.

Control of other operations of the vehicle responsive to conditions detected by the MMW radar 109 is also contemplated.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc. As an example, in one or more arrangements, the environment sensors 122 can include one or more radar sensors, one or more LIDAR sensors, one or more sonar sensors, and/or one or more cameras (not shown).

The vehicle wireless communications interface 169 may be configured to enable and/or facilitate communication between the components and systems of the vehicle and entities (such as cloud facilities, cellular and other mobile communications devices, other vehicles, etc.) exterior of the vehicle. For example, an alert caused by operation of the sensor control module 117 (described in greater detail below) may be transmitted to an off-vehicle person or facility via the wireless communications interface 169.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In particular embodiments, the input system 130 may include buttons and/or switches enabling a user to stop or start the vehicle simply by actuating the buttons/switches. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The propulsion system 141 may include an engine (not shown) of the vehicle. The engine may be an internal combustion engine in a conventionally-powered vehicle, an internal combustion engine or an electric motor in a Hybrid electric-petroleum vehicle, or an electric motor in a fully electrically-powered vehicle, for example. The engine may be turned on in a conventional manner by activation of an ignition switch. In one or more arrangements, the ignition switch may be configured to be activatable by a human driver or vehicle occupant. In certain embodiments, the ignition switch may be configured to be turned "on" or "off" autonomously by a command from processor(s) 110 under instructions from one of the modules, such as sensor control module 117.

In one or more arrangements, the transmission system 145 may be configured to be actuatable responsive to control commands generated by the sensor control module 117 when an unsafe seating condition is detected in the vehicle. For example, the vehicle may be configured to enable a user to use the input system 130 to select an option whereby the sensor control module 117 automatically generates a signal preventing shifting of the transmission to a "drive" mode if an unsafe seating condition is detected, and until the command preventing shifting is manually over-ridden by a user.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160 and/or the sensor control module(s) 117. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles and/or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110 and/or by one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the sensor control module 117, and/or the autonomous driving module(s) 160 can be operably connected to communicate with the other elements of the vehicle, including various vehicle systems 140 and/or individual components thereof. For example, returning to FIG. 1, the processor(s) 110, the sensor control module 117 and/or the autonomous driving module(s) 160 can be in communication to send and/or receive information from the various vehicle systems 140 to control the movement, speed, maneuvering, heading, direction, etc. of the vehicle 100. The processor(s) 110, the sensor control module 117 and/or the autonomous driving module(s) 160 may control some or all of these vehicle systems 140 and, thus, may be partially or fully autonomous.

The processor(s) 110, the sensor control module 117, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

In one or more arrangements described herein, a system for controlling operation of a vehicle one or more of vehicle sensors 121 for monitoring an occupant compartment of a vehicle may include the processor(s) 110 and memory 112 communicably coupled to the processor(s) 110 and storing the sensor control module 117. The sensor control module 117 can be configured to receive data from one or more sensors of the sensor system 120 and/or any other type of system capable of capturing information relating to the vehicle 100.

The sensor control module 117 may include computer-readable instructions that, when executed by the processor(s) 110, cause the processor(s) to use sensor data and/or other information to make determinations and perform (or cause performance of) operations as described herein. The vehicle 100 may include any and all sensors, mechanisms, systems (in the form of software and/or hardware), etc., needed for the sensor control module 117 to detect conditions and/or events and to make determinations based on the considerations and using the information described herein and any other available information. The sensor control module 117 may include computer-readable instructions that, when executed by the processor(s) 110, cause the processor(s) to activate, deactivate, and/or otherwise control vehicle components and/or systems and aspects of vehicle operation as described herein, responsive to information acquired by the vehicle sensors and/or the occurrence of other conditions and events. The sensor control module 117 may be configured to operate in conjunction with the autonomous driving module(s) 160 and/or any other vehicle component and/or system to control any operations of the vehicle 100 as described herein.

In one or more arrangements, the sensor control module may include including computer-readable instructions that when executed by the processor(s) cause the processor(s) to, when the vehicle is stationary and while one or more doors of the vehicle are open, (a) automatically control operation of the radar sensor to perform at least one preliminary scan of a portion of an interior of the vehicle including the one or more open doors. The sensor control module may also be configured to (b) determine, using information acquired by the at least one preliminary scan of the vehicle interior, a number of occupants currently in the vehicle. The sensor control module may also be configured to repeat the operations (a) and (b) until all doors of the vehicle are closed. These operations may determine and update a total number of occupants currently in the vehicle interior.

The sensor control module may also be configured to, responsive to receiving a control command whose execution will result in movement of the vehicle, control operation of the radar sensor to perform a pre-movement scan of the vehicle interior. The sensor control module may also be configured to determine, using information acquired by the pre-movement scan, if an excessive occupant condition exists in the vehicle interior and, responsive to a determination that an excessive occupant condition exists, control an operation of the vehicle other than executing the control command. The operation other than executing the control command may be, for example, the generation of an alert indicating the existence of an unsafe seating condition in the vehicle interior, or another operation as described herein.

In one or more arrangements, the sensor control module includes computer-readable instructions that when executed by the processor(s) cause the processor(s) to, while the vehicle is still stationary, determine, after all vehicle doors have been closed, that at least one vehicle door has re-opened. The sensor control module may also be configured to, while one or more doors of the vehicle are open, (a) automatically control operation of the radar sensor to perform at least one preliminary scan of a portion of an interior of the vehicle including the one or more open doors, and (b) determine, using information acquired by the at least one preliminary scan of the vehicle interior, a number of occupants currently in the vehicle. The sensor control module may also be configured to repeat the operations (a) and (b) until all doors of the vehicle are again closed. These operations may determine and update a total number of occupants currently in the vehicle interior if the vehicle doors are re-opened after being closed while the vehicle is still stationary. Thus, the number of occupants in the interior will be constantly updated no matter how many times the doors are opened and closed prior to the vehicle moving.

In one or more arrangements, the sensor control module may also include computer-readable instructions that when executed by the processor(s) cause the processor(s) to, responsive to a determination that an excessive occupant condition does not exist, determine, using information acquired by the pre-movement scan, if an insufficient seat occupation condition exists in the vehicle interior. The sensor control module may also be configured to, responsive to a determination that an insufficient seat occupation condition does not exist exists, control an operation of the vehicle and, responsive to a determination that an insufficient seat occupation condition does [[not]] exist, control an operation of the vehicle other than executing the control command.

In one or more arrangements, the sensor control module may also include computer-readable instructions that when executed by the processor(s) cause the processor(s) to, prior to controlling operation of the radar sensor to perform the at least one preliminary scan, determine (in block 1020) if an engine of the vehicle is running. The sensor control module may be configured to (in block 1014), if the engine is not running, control operation of the radar sensor to perform the at least one preliminary scan at a first scan rate. The sensor control module may also be configured to (in block 1026), if the engine is running, control operation of the radar sensor to perform the at least one preliminary scan at a second scan rate greater than the first scan rate. This enables scanning at a greater scan rate for more timely radar data when the radar sensor(s) 109 can draw power from a running vehicle engine.

In one or more arrangements, the sensor control module may also include computer-readable instructions that when executed by the processor(s) cause the processor(s) to determine, using information acquired by the pre-movement scan, if a boundary overlap condition exists in the vehicle interior, and responsive to a determination that a boundary overlap condition exists, control an operation of the vehicle. The sensor control module may also include computer-readable instructions that when executed by the processor(s) cause the processor(s) to determine, using information acquired by the pre-movement scan, if a multiple occupant condition exists in the vehicle interior and, responsive to a determination that a multiple occupant condition exists, control an operation of the vehicle.

In one or more arrangements, the sensor control module may include computer-readable instructions that when executed by the processor(s) cause the processor(s) to determine, using information acquired by the pre-movement scan of the vehicle interior, if an occupant resides on a floor 100f of the vehicle and responsive to a determination that an occupant resides on a floor of the vehicle, control an operation of the vehicle. The sensor control module may also include computer-readable instructions that when executed by the processor(s) cause the processor(s) to determine, using information acquired by the pre-movement scan, if an occupant resides in a cargo area of the vehicle and, responsive to a determination that an occupant resides in a cargo area of the vehicle, control an operation of the vehicle.

In one or more arrangements, the sensor control module may include computer-readable instructions that when executed by the processor cause the processor to perform one or more movement radar scans of the vehicle while the vehicle is in motion and determine, using information acquired by any of the movement scans, if an unsafe seating condition exists in the vehicle interior. The sensor control module may also be configured to, responsive to a determination that an unsafe seating condition exists, control an operation of the vehicle.

In one or more arrangements described herein, controlling an operation of the vehicle may include controlling an output system of the vehicle to generate an alert. In one or more arrangements described herein, controlling an operation of the vehicle may include controlling an operation of the vehicle to prevent movement of the vehicle responsive to the control command whose execution will result in movement of the vehicle, until a user has acknowledged receipt of the alert.

Figure 10:
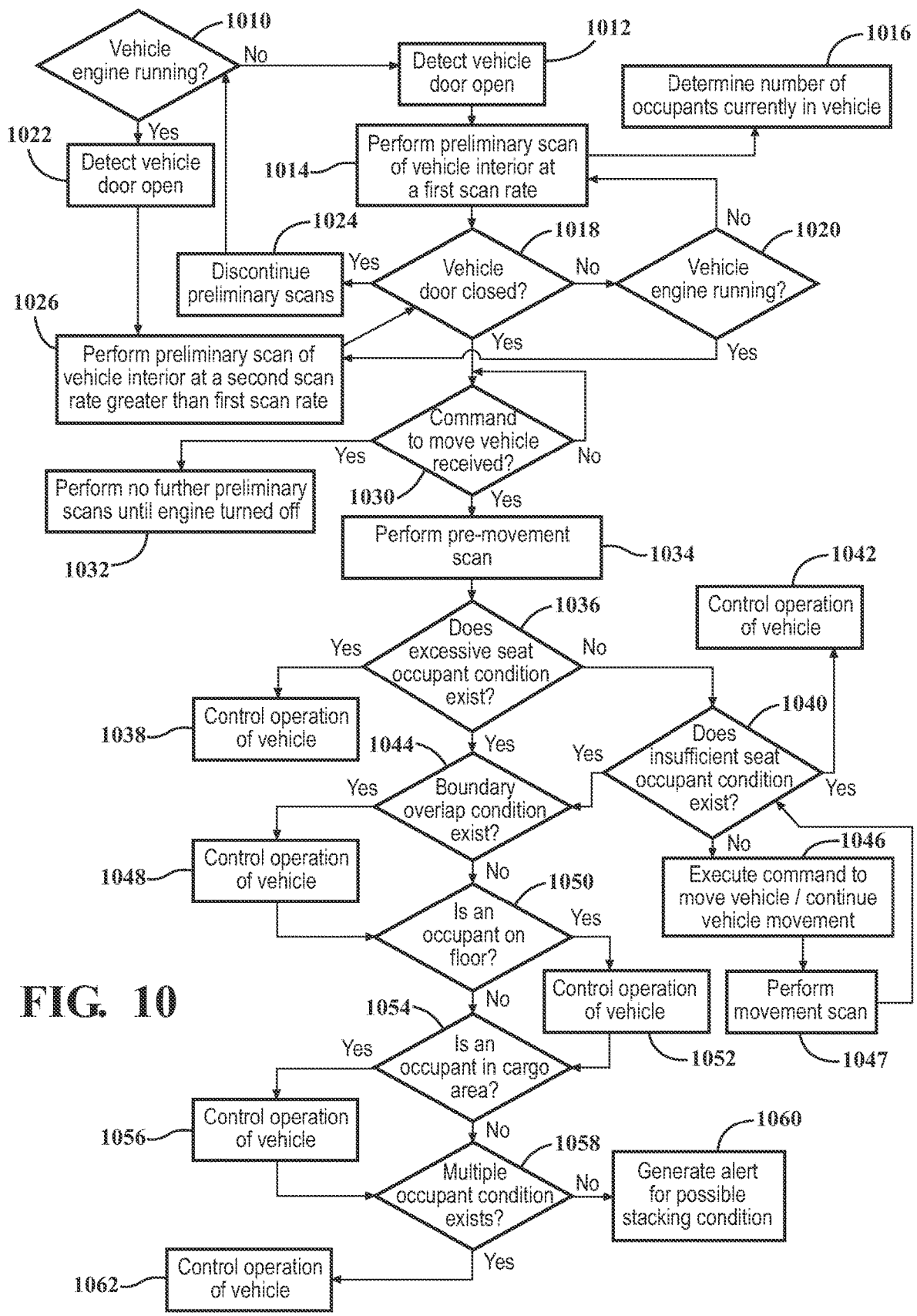
FIG. 10 is a flow diagram illustrating operations of the vehicle radar sensor to scan an interior of the vehicle and control one or more operations of the vehicle responsive to sensor data.

FIG. 10 is a flow diagram illustrating operations of the vehicle radar sensor 109 to scan an interior of the vehicle and control one or more operations of the vehicle responsive to sensor data.

In block 1010, the sensor control module 117 may determine if the vehicle engine is running. If the vehicle engine is not running, it may be desirable to control the radar scanning rate to conserve vehicle battery power. Thus, the preliminary scans may be performed at a relatively lower scan rate. If the vehicle engine is not running, the sensor control module 117 may (in block 1012) detect when at least one vehicle door opens.

When a vehicle door is opened, the sensor control module 117 may (in block 1014) control operation of the radar sensor to perform a preliminary scan of the vehicle interior at a first, relatively lower scan rate. The scan may include open door(s) of the vehicle so that acquired data may be used to determine a number occupants entering and exiting the vehicle during the scan. The sensor control module 117 may then (in block 1016), using data from any preliminary scans, determine a number occupants currently residing in the vehicle interior. In addition, the sensor control module 117 may (in block 1018) determine if all open vehicle door(s) are closed. If all vehicle door(s) are not closed, the radar sensor

109 may be controlled to continue with preliminary scans. To this end, the sensor control module 117 may (in block 1020) determine if the vehicle engine is running to determine if the radar sensor 109 may draw power from the engine. If the vehicle engine is not running, control may pass back to block 1014, where another preliminary scan may be performed under battery power.

The cycle 1014-1016-1018-1020 may be continued while at least one vehicle door is still open and while the engine remains off. Returning to block 1018, if all vehicle doors are determined to be closed, then no occupants may enter or leave the vehicle. Then, the sensor control module 117 may (in block 1024) discontinue the preliminary scans. Control may then pass back to block 1010, where the sensor control module may continue to monitor the engine status and wait for one or more vehicle door(s) to open again. Simultaneously, if all vehicle doors are determined to be closed, control may also transfer to block 1030, where the sensor control module 117 may constantly monitor for receipt of a control command whose execution will result in movement of the vehicle. When (in block 1030) a control command whose execution will result in movement of the vehicle is received, the sensor control module 117 may proceed to block 1034 as described below. In addition, since a "preliminary scan" is a scan performed prior to receipt and/or implementation of a control command whose execution will result in movement of the vehicle, there is no longer any need at the current time to perform any more preliminary scans. Thus, the sensor control module 117 may (in block 1032) discontinue the performance of preliminary scans until, for example, the vehicle engine is turned off.

Returning to blocks 1010 and 1022, if it is determined that the engine is running and one or more door(s) are detected to be open, the sensor control module 117 may (in block 1026) control operation of the radar sensor to perform a preliminary scan of the vehicle interior. If desired, preliminary scans performed while the engine is turned on may be performed at a relatively higher scanning rate because the radar sensor 109 may be operated using power derived from the running engine.

The blocks 1010-1026 may execute as described prior to receipt (in block 1030) by the sensor control module 117 of a control command whose execution will result in movement of the vehicle, to determine and update the number of occupants currently in the vehicle interior. This number may be employed in controlling further operations of the vehicle as described herein, after the movement control command is received. The system may be designed to perform the scans at a relatively lower scanning rate when the engine is off, to conserve battery power.

Execution of the blocks 1010-1026 may continue until it is determined (in block 1018) that all vehicle doors are closed. Responsive to a determination that all vehicle doors are closed, the sensor control module 117 (in block 1030) may constantly monitor for receipt of a control command whose execution will result in movement of the vehicle. The various vehicle components and systems may be configured so that any command, from any source, whose execution will result in movement of the vehicle may also be forwarded to the sensor control module. When a control command whose execution will result in movement of the vehicle is received, the sensor control module 117 may (in block 1034) control operation of the radar sensor 109 to perform a pre-movement scan of the vehicle interior.

The sensor control module 117 may then (in block 1036), using the number of occupants currently in the interior and the number of seats, determine of an excessive seat occupant condition exists. If an excessive seat occupant condition exists, the sensor control module may (in block 1038) control one or more operations of the vehicle. The operation(s) may include, for example, controlling the output system to generate an audible alert indicating that the excessive seat occupant condition exists. The sensor control module 117 may also control other operation(s) of the vehicle at this time.

The sensor control module 117 may also (starting in block 1044) perform steps directed to acquiring further details regarding the excessive seat occupant condition so that a driver and/or other user of the vehicle may be advised. For example, the sensor control module 117 may (in block 1044) determine (using information acquired in the pre-movement scan) if a boundary overlap condition exists. If a boundary overlap condition exists, the sensor control module 117 may (in block 1048) control one or more further operations of the vehicle. The operation(s) may include, for example, controlling the output system to generate an audible alert indicating that the boundary overlap condition exists and also (optionally) controlling a display of the output system 135 to show a schematic view of the vehicle interior highlighting a location where the boundary overlap condition exists.

However, if the boundary overlap condition does not exist, the sensor control module 117 may (in block 1050) determine (using information acquired in the pre-movement scan) if an occupant currently resides on the floor 100*f* (i.e., in the floor zone C). If an occupant currently resides on the floor 100*f*, the sensor control module 117 may (in block 1052) control one or more further operations of the vehicle. The operation(s) may include, for example, controlling the output system to generate an audible alert indicating that an occupant resides on the floor.

If an occupant does not currently reside on the floor, the sensor control module 117 may (in block 1054) determine (using information acquired in the pre-movement scan) if an occupant currently resides in the cargo area 100*c* (i.e., in the cargo zone G). If an occupant currently resides in the cargo area 100*c*, the sensor control module 117 may (in block 1056) control one or more further operations of the vehicle. The operation(s) may include, for example, controlling the output system to generate an audible alert indicating that an occupant resides in the cargo area. However, if an occupant does not currently reside in the cargo area, the sensor control module 117 may (in block 1058) determine (using information acquired in the pre-movement scan) if a multiple occupant condition exists in one or more of the vehicle seats.

If a multiple occupant condition exists, the sensor control module 117 may (in block 1062) control one or more further operations of the vehicle. The operation(s) may include, for example, controlling the output system to generate an audible alert indicating that the multiple occupant condition exists and also (optionally) controlling a display of the output system 135 to show a schematic view of the vehicle interior highlighting a location where the multiple occupant condition exists. However, if a multiple occupant condition does not exist, the sensor control module 117 may (in block 1060) control the output system to generate an audible alert indicating that a "stacking" condition may exist somewhere in one or more of the seats, because an excessive occupant condition was detected but the radar did not detect any of the other conditions described. The sensor control module 117 may also control other operation(s) of the vehicle at this time.

Returning to block 1036, if an excessive seat occupant condition does not exist, the sensor control module 117 may (in block 1040), using the number of occupants currently in the interior and the number of seats, determine if an insufficient seat occupant condition exists. If an insufficient seat occupant condition exists, the sensor control module 117 may (in block 1042) control one or more operations of the vehicle. The operation(s) may include, for example, controlling the output system to generate an audible alert indicating that the insufficient seat occupant condition exists. The sensor control module 117 may also control other operation(s) of the vehicle at this time. In addition, sensor control module 117 may also proceed with execution of the blocks 1044-1060 previously described, to acquire more information to present to a user. However, if an insufficient seat occupant condition does not exist, the sensor control module may (in block 1046) implement the control command whose execution will result in movement of the vehicle, or enable or allow the movement control command to be implemented (i.e., if no unsafe seating conditions are detected by the radar sensor 109, it may be assumed that all occupants are safely seated and movement of the vehicle may be permitted without generation of any alerts or other control commands). If the vehicle is already in motion, the sensor control module may maintain the motion of the vehicle. Movement radar scans (block 1047) may then continue while the vehicle is in motion to detect unsafe driving conditions that occur during vehicle movement.

Any of the alerts described herein may be in any suitable form, such as audible, visual, tactile or a combination of these. Following generation of the at least a first alert, additional alerts may be generated if the first alert is not acknowledged. Successive alerts may increase in intensity and involve the transmission of messages via a wide variety of media, and to a wide variety of recipients. Any alerts generated may include a request for response or acknowledgement of receipt of the alert by the recipient.

Use of the radar sensor and the data acquired by the sensor as described herein may facilitate elimination of other types of sensors (for example, cameras and motion sensors) that would otherwise be used to detect or determine various conditions in the occupant compartment. This may reduce vehicle production costs and reduce the complexity of sensor data interpretation and integration.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling operation of a vehicle, the system comprising:
    a millimeter-wave radar sensor;
    a processor; and
    a memory communicably coupled to the processor and storing a sensor control module including computer-readable instructions that when executed by the processor cause the processor to:
        when the vehicle is stationary, and while one or more doors of the vehicle are open:
        (a) automatically control operation of the radar sensor to perform at least one preliminary scan of a portion of an interior of the vehicle including the one or more open doors;
        (b) determine, using information acquired by the at least one preliminary scan of the vehicle interior, a number of occupants currently in the vehicle; and
        (c) repeat steps (a)-(b) until all doors of the vehicle are closed;
        responsive to receiving a control command whose execution will result in movement of the vehicle, control operation of the radar sensor to perform a pre-movement scan of the vehicle interior;
        determine, using information acquired by the pre-movement scan, if an excessive occupant condition exists in the vehicle interior; and
        responsive to a determination that an excessive occupant condition exists, control an operation of the vehicle other than executing the control command.

2. The system of claim 1 wherein the sensor control module includes computer-readable instructions that when executed by the processor cause the processor to:
    responsive to a determination that an excessive occupant condition does not exist, determine, using information acquired by the pre-movement scan, if an insufficient seat occupation condition exists in the vehicle interior;
    responsive to a determination that an insufficient seat occupation condition exists, control an operation of the vehicle other than executing the control command; and
    responsive to a determination that an insufficient seat occupation condition does not exist, control an operation of the vehicle.

3. The system of claim 1 wherein the sensor control module includes computer-readable instructions that when executed by the processors cause the processor to:
    prior to controlling operation of the radar sensor to perform the at least one preliminary scan, determine if an engine of the vehicle is running;
    if the engine is not running, control operation of the radar sensor to perform the at least one preliminary scan at a first scan rate; and
    if the engine is running, control operation of the radar sensor to perform the at least one preliminary scan at a second scan rate greater than the first scan rate.

4. The system of claim 1 wherein the sensor control module includes computer-readable instructions that when executed by the processor cause the processor to, while the vehicle is still stationary:
    determine, after all vehicle doors have been closed, that at least one vehicle door has re-opened; and
    perform steps (a)-(c).

5. The system of claim 1 wherein the sensor control module includes computer-readable instructions that when executed by the processor cause the processor to:
    determine, using information acquired by the pre-movement scan, if a boundary overlap condition exists in the vehicle interior; and
    responsive to a determination that a boundary overlap condition exists, control an operation of the vehicle.

6. The system of claim 1, wherein the sensor control module includes computer-readable instructions that when executed by the processor cause the processor to:
    determine, using information acquired by the pre-movement scan, if a multiple occupant condition exists in the vehicle interior; and
    responsive to a determination that a multiple occupant condition exists, control an operation of the vehicle.

7. The system of claim 1 wherein the sensor control module includes computer-readable instructions that when executed by the processor cause the processor to:
    determine, using information acquired by the pre-movement scan of the vehicle interior, if an occupant resides on a floor of the vehicle; and
    responsive to a determination that an occupant resides on a floor of the vehicle, control an operation of the vehicle.

8. The system of claim 1 wherein the sensor control module includes computer-readable instructions that when executed by the processor cause the processor to:
    determine, using information acquired by the pre-movement scan, if an occupant resides in a cargo area of the vehicle; and
    responsive to a determination that an occupant resides in a cargo area of the vehicle, control an operation of the vehicle.

9. The system of claim 1 wherein controlling an operation of the vehicle comprises controlling an output system of the vehicle to generate an alert.

10. The system of claim 9 wherein controlling an operation of the vehicle comprises controlling an operation of the vehicle to prevent movement of the vehicle responsive to the control command whose execution will result in movement of the vehicle, until a user has acknowledged receipt of the alert.

11. The system of claim 1 wherein the sensor control module includes computer-readable instructions that when executed by the processor cause the processor to:
perform one or more movement radar scans of the vehicle while the vehicle is in motion;
determine, using information acquired by any of the movement scans, if an unsafe seating condition exists in the vehicle interior; and
responsive to a determination that an unsafe seating condition exists, control an operation of the vehicle.

12. A method of controlling operation of a vehicle, comprising steps of:
when the vehicle is stationary, and while one or more doors of the vehicle are open:
(a) automatically controlling operation of a millimeter-wave radar sensor to perform at least one preliminary scan of a portion of an interior of the vehicle including the one or more open doors;
(b) determining, using information acquired by the at least one preliminary scan of the vehicle interior, a number of occupants currently in the vehicle; and
(c) repeating steps (a)-(b) until all doors of the vehicle are closed;
receiving a control command whose execution will result in movement of the vehicle;
responsive to receiving the control command, controlling operation of the radar sensor to perform a pre-movement scan of the vehicle interior;
determining, using information acquired by the pre-movement scan, if either of an excessive occupant condition or an insufficient seat occupation condition exists in the vehicle interior;
if neither of the excessive occupant condition or the insufficient seat occupation condition exists, executing the control command; and
if either of the excessive occupant condition or the insufficient seat occupation condition exists, controlling an operation of the vehicle other than executing the control command.

13. The method of claim 12 further comprising steps of:
prior to controlling operation of the radar sensor to perform the at least one preliminary scan, determining if an engine of the vehicle is running;
if the engine is not running, controlling operation of the radar sensor to perform the at least one preliminary scan at a first scan rate; and
if the engine is running, controlling operation of the radar sensor to perform the at least one preliminary scan at a second scan rate greater than the first scan rate.

14. The method of claim 12 further comprising steps of, while the vehicle is still stationary:
determining, after all vehicle doors have been closed, that at least one vehicle door has re-opened; and
performing steps (a)-(c).

15. The method of claim 12, further comprising steps of:
determining, using information acquired by the pre-movement scan, if a boundary overlap condition exists in the vehicle interior; and
responsive to a determination that a boundary overlap condition exists, controlling an operation of the vehicle.

16. The method of claim 12 further comprising steps of:
determining, using information acquired by the pre-movement scan, if a multiple occupant condition exists in the vehicle interior; and
responsive to a determination that a multiple occupant condition exists, controlling an operation of the vehicle.

17. The method of claim 12 further comprising steps of:
determining, using information acquired by the pre-movement scan of the vehicle interior, if an occupant resides on a floor of the vehicle; and
responsive to a determination that an occupant resides on a floor of the vehicle, controlling an operation of the vehicle.

18. The method of claim 12 further comprising steps of:
determining, using information acquired by the pre-movement scan, if an occupant resides in a cargo area of the vehicle; and
responsive to a determination that an occupant resides in a cargo area of the vehicle, controlling an operation of the vehicle.

19. A non-transitory computer readable medium having stored therein instructions, that when executed by a computing system, cause the computing system to perform functions comprising:
when a vehicle is stationary, and while one or more doors of the vehicle are open:
(a) automatically controlling operation of a millimeter-wave radar sensor to perform at least one preliminary scan of a portion of an interior of the vehicle including the one or more open doors;
(b) determining, using information acquired by the at least one preliminary scan of the vehicle interior, a number of occupants currently in the vehicle; and
(c) repeating steps (a)-(b) until all doors of the vehicle are closed;
receiving a control command whose execution will result in movement of the vehicle;
responsive to receiving the control command, control operation of the radar sensor to perform a pre-movement scan of the vehicle interior;
determining, using information acquired by the pre-movement scan, if either of an excessive occupant condition or an insufficient seat occupation condition exists in the vehicle interior;
if neither of the excessive occupant condition or the insufficient seat occupation condition exists, executing the control command; and
if either of the excessive occupant condition or the insufficient seat occupation condition exists, controlling an operation of the vehicle other than executing the control command.

20. The non-transitory computer readable medium of claim 19 further including stored therein instructions, that when executed by the computing system, cause the computing system to perform functions comprising:
prior to controlling operation of the radar sensor to perform the at least one preliminary scan, determining if an engine of the vehicle is running;
if the engine is not running, controlling operation of the radar sensor to perform the at least one preliminary scan at a first scan rate; and
if the engine is running, controlling operation of the radar sensor to perform the at least one preliminary scan at a second scan rate greater than the first scan rate.

* * * * *